(12) United States Patent
Yamasaki et al.

(10) Patent No.: US 11,077,615 B2
(45) Date of Patent: Aug. 3, 2021

(54) THREE-DIMENSIONAL MODELING APPARATUS AND EJECTION UNIT

(71) Applicant: Seiko Epson Corporation, Tokyo (JP)

(72) Inventors: Keigo Yamasaki, Shiojiri (JP); Kohei Yuwaki, Shiojiri (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/581,803

(22) Filed: Sep. 25, 2019

(65) Prior Publication Data

US 2020/0094476 A1 Mar. 26, 2020

(30) Foreign Application Priority Data

Sep. 26, 2018 (JP) .............................. JP2018-180016

(51) Int. Cl.
| | |
|---|---|
| *B29C 64/209* | (2017.01) |
| *B29C 64/227* | (2017.01) |
| *B29C 64/245* | (2017.01) |
| *B29C 64/255* | (2017.01) |
| *B29C 64/295* | (2017.01) |
| *B33Y 30/00* | (2015.01) |

(52) U.S. Cl.
CPC .......... *B29C 64/209* (2017.08); *B29C 64/227* (2017.08); *B29C 64/245* (2017.08); *B29C 64/255* (2017.08); *B29C 64/295* (2017.08); *B33Y 30/00* (2014.12)

(58) Field of Classification Search
CPC ... B29C 64/209; B29C 64/227; B29C 64/245; B29C 64/255; B29C 64/295; B29C 64/314; B29C 64/241
See application file for complete search history.

(56) References Cited

U.S. PATENT DOCUMENTS

2017/0203506 A1* 7/2017 Hjelsand ................ B29C 48/92

FOREIGN PATENT DOCUMENTS

| JP | 4260875 B2 * | 4/2009 | ........... B29B 7/7471 |
|---|---|---|---|
| JP | 2009-137260 A | 6/2009 | |
| JP | 2009-269182 A | 11/2009 | |
| JP | 2009-269183 A | 11/2009 | |
| JP | 2009-285879 A | 12/2009 | |
| JP | 2010-000752 A | 1/2010 | |
| JP | 2010-208051 A | 9/2010 | |
| JP | 2010-214839 A | 9/2010 | |
| JP | 2010-241016 A | 10/2010 | |
| JP | 2011-020378 A | 2/2011 | |
| WO | WO-2007-119533 A1 | 10/2007 | |

* cited by examiner

*Primary Examiner* — Joseph S Del Sole
*Assistant Examiner* — Mohamed K Ahmed Ali
(74) *Attorney, Agent, or Firm* — Harness, Dickey & Pierce, P.L.C.

(57) ABSTRACT

Provided is a three-dimensional modeling apparatus including: a drive motor; a screw that has a groove formation surface with a groove formed therein and that is rotated by the drive motor; a barrel that has a facing surface facing the groove formation surface and having a communication hole at the center thereof and a heater; and a nozzle that ejects a modeling material supplied from the communication hole, in which $$0.03 \leq (Ss/Ls)/(Sn/Ln) \leq 5.00 \qquad (1)$$

where Ss is an average sectional area that is an arithmetic mean between a maximum sectional area and a minimum sectional area of the groove, Ls is a length of the groove, Sn is a sectional area of the nozzle, and Ln is a length of the nozzle.

6 Claims, 21 Drawing Sheets

FIG. 12

| $S_s$ [m²] | S/L RATIO | AMOUNT OF EJECTION [%] |
|---|---|---|
| 3.60 × 10⁻⁵ | 18.33 | 11% |
| 2.50 × 10⁻⁵ | 12.73 | 20% |
| 1.60 × 10⁻⁵ | 8.15 | 40% |
| 1.23 × 10⁻⁵ | 6.24 | 50% |
| 9.00 × 10⁻⁶ | 4.58 | 100% |
| 6.25 × 10⁻⁶ | 3.18 | 167% |
| 4.00 × 10⁻⁶ | 2.04 | 333% |
| 2.25 × 10⁻⁶ | 1.15 | 767% |
| 1.00 × 10⁻⁶ | 0.51 | 1577% |
| 5.63 × 10⁻⁷ | 0.29 | 1587% |
| 2.50 × 10⁻⁷ | 0.13 | 1000% |
| 6.25 × 10⁻⁸ | 0.03 | 320% |

FIG. 14

| Ss [m²] | S/L RATIO | AMOUNT OF EJECTION [%] |
|---|---|---|
| $3.60 \times 10^{-5}$ | 18.33 | 5% |
| $2.50 \times 10^{-5}$ | 12.73 | 12% |
| $1.60 \times 10^{-5}$ | 8.15 | 29% |
| $1.23 \times 10^{-5}$ | 6.24 | 43% |
| $9.00 \times 10^{-6}$ | 4.58 | 123% |
| $6.25 \times 10^{-6}$ | 3.18 | 263% |
| $4.00 \times 10^{-6}$ | 2.04 | 499% |
| $2.25 \times 10^{-6}$ | 1.15 | 833% |
| $1.00 \times 10^{-6}$ | 0.51 | 1377% |
| $5.63 \times 10^{-7}$ | 0.29 | 1533% |
| $2.50 \times 10^{-7}$ | 0.13 | 1100% |
| $6.25 \times 10^{-8}$ | 0.03 | 337% |

FIG. 16

| $S_s$ [m²] | S/L RATIO | AMOUNT OF EJECTION [%] |
|---|---|---|
| $3.60 \times 10^{-5}$ | 4.58 | 267% |
| $2.50 \times 10^{-5}$ | 3.18 | 500% |
| $1.60 \times 10^{-5}$ | 2.04 | 1033% |
| $1.23 \times 10^{-5}$ | 1.56 | 1600% |
| $9.00 \times 10^{-6}$ | 1.15 | 2433% |
| $6.25 \times 10^{-6}$ | 0.80 | 3800% |
| $4.00 \times 10^{-6}$ | 0.51 | 5667% |
| $2.25 \times 10^{-6}$ | 0.29 | 6233% |
| $1.00 \times 10^{-6}$ | 0.13 | 4000% |
| $5.63 \times 10^{-7}$ | 0.07 | 2567% |
| $2.50 \times 10^{-7}$ | 0.03 | 1267% |
| $6.25 \times 10^{-8}$ | 0.01 | 333% |

FIG. 18

| Ss [m²] | S/L RATIO | AMOUNT OF EJECTION [%] |
|---|---|---|
| $3.60 \times 10^{-5}$ | 5.73 | 333% |
| $2.50 \times 10^{-5}$ | 3.98 | 667% |
| $1.60 \times 10^{-5}$ | 2.55 | 1400% |
| $1.23 \times 10^{-5}$ | 1.95 | 2200% |
| $9.00 \times 10^{-6}$ | 1.43 | 3533% |
| $6.25 \times 10^{-6}$ | 0.99 | 5800% |
| $4.00 \times 10^{-6}$ | 0.64 | 7000% |
| $2.25 \times 10^{-6}$ | 0.36 | 7000% |
| $1.00 \times 10^{-6}$ | 0.16 | 4167% |
| $5.63 \times 10^{-7}$ | 0.09 | 2633% |
| $2.50 \times 10^{-7}$ | 0.04 | 1000% |
| $6.25 \times 10^{-8}$ | 0.01 | 333% |

FIG. 23

| Ss [m²] | S/L RATIO | AMOUNT OF EJECTION [%] |
|---|---|---|
| TWO GROOVES | | |
| $3.60 \times 10^{-5}$ | 18.33 | 9% |
| $2.50 \times 10^{-5}$ | 12.73 | 18% |
| $1.60 \times 10^{-5}$ | 8.15 | 39% |
| $1.23 \times 10^{-5}$ | 6.24 | 65% |
| $9.00 \times 10^{-6}$ | 4.58 | 102% |
| $6.25 \times 10^{-6}$ | 3.18 | 186% |
| $4.00 \times 10^{-6}$ | 2.04 | 357% |
| $2.25 \times 10^{-6}$ | 1.15 | 770% |
| $1.00 \times 10^{-6}$ | 0.51 | 1720% |
| $5.63 \times 10^{-7}$ | 0.29 | 2340% |
| $2.50 \times 10^{-7}$ | 0.13 | 1780% |
| $6.25 \times 10^{-8}$ | 0.03 | 550% |

FIG. 24

| | THREE GROOVES | |
|---|---|---|
| $S_s$ [m$^2$] | S/L RATIO | AMOUNT OF EJECTION [%] |
| $3.60 \times 10^{-5}$ | 18.33 | 9% |
| $2.50 \times 10^{-5}$ | 12.73 | 18% |
| $1.60 \times 10^{-5}$ | 8.15 | 39% |
| $1.23 \times 10^{-5}$ | 6.24 | 64% |
| $9.00 \times 10^{-6}$ | 4.58 | 102% |
| $6.25 \times 10^{-6}$ | 3.18 | 187% |
| $4.00 \times 10^{-6}$ | 2.04 | 357% |
| $2.25 \times 10^{-6}$ | 1.15 | 790% |
| $1.00 \times 10^{-6}$ | 0.51 | 1893% |
| $5.63 \times 10^{-7}$ | 0.29 | 2813% |
| $2.50 \times 10^{-7}$ | 0.13 | 2340% |
| $6.25 \times 10^{-8}$ | 0.03 | 853% | ously discovered that there was a room for
THREE-DIMENSIONAL MODELING APPARATUS AND EJECTION UNIT The present application is based on, and claims priority from, JP Application Serial Number 2018-180016, filed Sep. 26, 2018, the disclosure of which is hereby incorporated by reference herein in its entirety.

BACKGROUND

1. Technical Field

The present disclosure relates to a three-dimensional modeling apparatus and an ejection unit.

2. Related Art

For example, JP-A-2010-241016 discloses a plasticization device including a rotor with a spiral groove formed in an end surface thereof and a barrel that faces the end surface of the rotor in which the spiral groove is formed and that has a communication hole formed at the center thereof.

In a case in which a nozzle with a small diameter is used for modeling a three-dimensional modeled article with dimensional precision in a three-dimensional modeling apparatus that melts a material using a plasticization device as described above and ejecting the molten material from the nozzle, the amount of ejection decreases, and a modeling speed thus decreases. In this regard, the inventors of the present application discovered that there was a room for enhancing the amount of ejection by appropriately setting the dimension of the nozzle and the dimension of the spiral groove as a result of intensive studies.

SUMMARY

An advantage of some aspects of the present disclosure is to provide a three-dimensional modeling apparatus with an improved amount of ejection from a nozzle.

According to an aspect of the present disclosure, a three-dimensional modeling apparatus is provided. The three-dimensional modeling apparatus includes: a drive motor; a screw that has a groove formation surface with a groove formed therein and that is rotated by the drive motor; a barrel that has a facing surface facing the groove formation surface and having a communication hole at the center thereof and a heater; and a nozzle that ejects a modeling material supplied from the communication hole, in which $$0.03 \leq (Ss/Ls)/(Sn/Ln) \leq 5.00 \quad (1)$$

where $Ss$ is an average sectional area that is an arithmetic mean between a maximum sectional area and a minimum sectional area of the groove, $Ls$ is a length of the groove, $Sn$ is a sectional area of the nozzle, and $Ln$ is a length of the nozzle.

BRIEF DESCRIPTION OF THE DRAWINGS

FIG. 12 is a first table illustrating a relationship between the S/L ratio and the amount of ejection.

FIG. 14 is a second table illustrating a relationship between the S/L ratio and the amount of ejection.

FIG. 16 is a third table illustrating a relationship between the S/L ratio and the amount of ejection.

FIG. 18 is a fourth table illustrating a relationship between the S/L ratio and the amount of ejection.

FIG. 23 is a table illustrating a relationship between an S/L ratio and an amount of ejection when two grooves are provided.

FIG. 24 is a table illustrating a relationship between an S/L ratio and an amount of ejection when three grooves are provided.

DESCRIPTION OF EXEMPLARY EMBODIMENTS

A. First Embodiment

Figure 1:
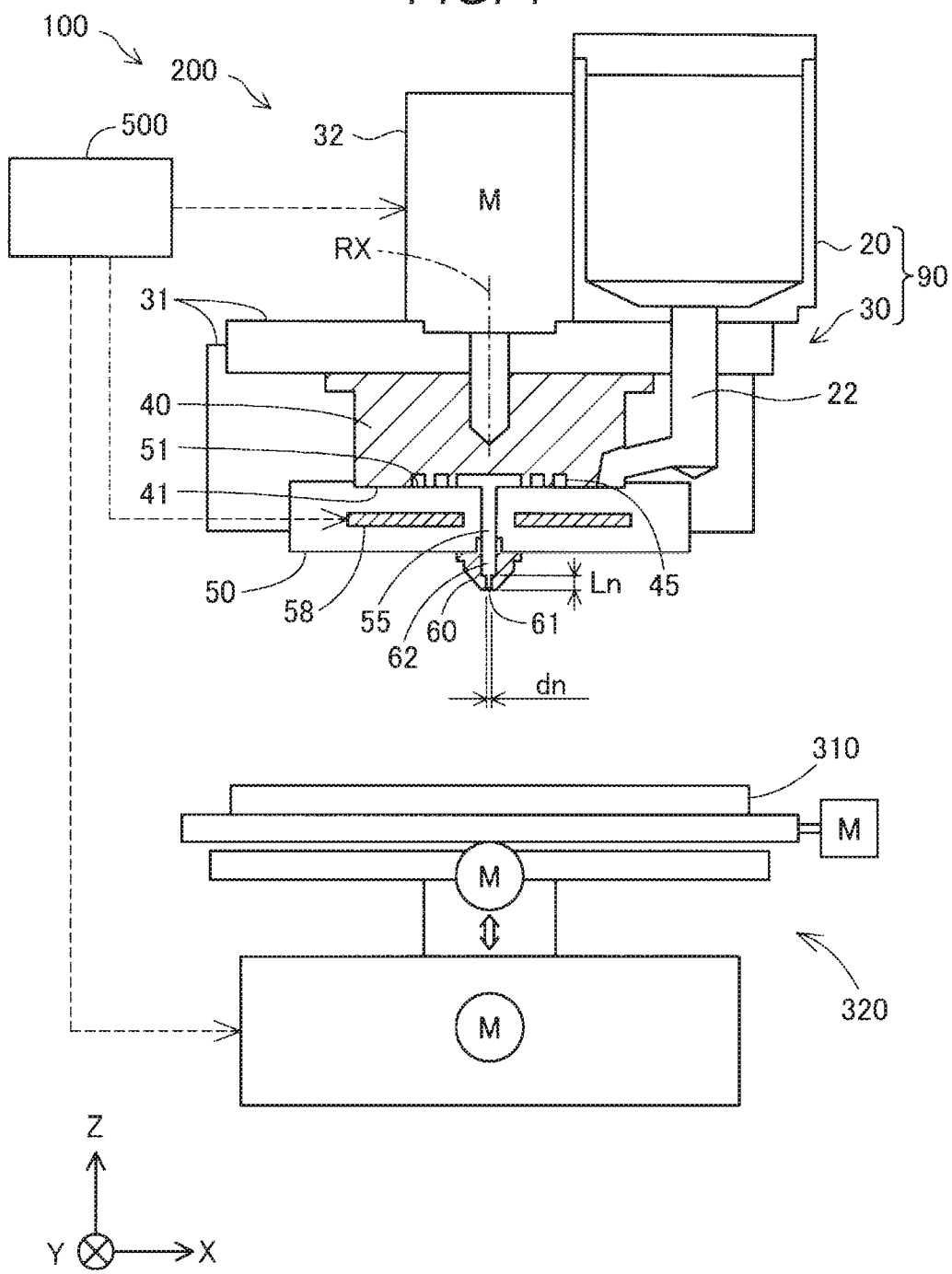
FIG. 1 is an explanatory diagram illustrating an outline configuration of a three-dimensional modeling apparatus according to a first embodiment.

FIG. 1 is an explanatory diagram illustrating an outline configuration of a three-dimensional modeling apparatus 100 according to a first embodiment. In FIG. 1, arrows along X, Y, and Z directions that perpendicularly intersect each other are illustrated. The X direction and the Y direction are directions along a horizontal direction, and the Z direction is a direction along a vertical direction. In the other diagrams, arrows along the X, Y, and Z directions are appropriately illustrated. The X, Y, and Z directions in FIG. 1 and the X, Y, and Z directions in the other diagrams represent the same directions.

The three-dimensional modeling apparatus 100 according to the embodiment includes an ejection unit 200 that has a nozzle 60 and a plasticization device 90, a modeling table 310, a moving mechanism 320, and a control unit 500. In the three-dimensional modeling apparatus 100 according to the embodiment, a modeling material plasticized by the plasticization device 90 is supplied to the nozzle 60, and the modeling material ejected from the nozzle 60 is stacked on the modeling table 310 under control provided by the control unit 500, thereby forming a three-dimensional modeled article. Note that the modeling material may also be referred to as a molten material.

The moving mechanism 320 changes relative positions of the modeling table 310 and the ejection unit 200. In the embodiment, the moving mechanism 320 moves the modeling table 310 relative to the ejection unit 200. The moving mechanism 320 according to the embodiment is a three-axis positioner that moves the modeling table 310 in three-axis directions, namely the X, Y, and Z directions using drive force of three motors. The individual motors are driven under control provided by the control unit 500.

The moving mechanism 320 may have a configuration in which the ejection unit 200 is moved without moving the modeling table 310 instead of the configuration in which the modeling table 310 is moved. Also, the moving mechanism 320 may have a configuration in which both the modeling table 310 and the ejection unit 200 are moved. Any configuration may be employed as long as it is possible to change the relative positions of the modeling table 310 and the ejection unit 200.

The control unit 500 is a computer including one or more processors, a main storage device, and an input/output interface that inputs and outputs signals to and from the outside. In the embodiment, the control unit 500 controls operations of the ejection unit 200 and the moving mechanism 320 and executes modeling processing of modeling a three-dimensional modeled article by a processor executing programs and commands read on the main storage device. The operations include movement of a three-dimensional relative positions of the ejection unit 200 relative to the modeling table 310. Note that the control unit 500 may be a combination of a plurality of circuits instead of the computer.

The plasticization device 90 includes a material supply unit 20 and a plasticization unit 30. The material supply unit 20 and the plasticization unit 30 communicate with each other via a supply path 22. The plasticization unit 30 and the nozzle 60 communicate with each other via a communication hole 55. The plasticization device 90 supplies a modeling material, which is obtained in the form of a paste by melting at least a part of a material in a solid state, to the nozzle 60.

The material supply unit 20 accommodates a material in the form of pellets, powder, or the like. The material in the embodiment is ABS resin in the form of pellets. The material supply unit 20 in the embodiment is a hopper. The material accommodated in the material supply unit 20 is supplied to the plasticization unit 30 via the supply path 22 provided below the material supply unit 20.

The plasticization unit 30 includes a screw case 31, a drive motor 32, a flat screw 40, and a barrel 50. The screw case 31 is a case body that accommodates the flat screw 40. The drive motor 32 is secured to an upper surface of the screw case 31. The drive motor 32 rotates the flat screw 40 about a rotation axis RX at the center by being driven under control provided by the control unit 500. Note that the flat screw 40 may also simply be referred to as a screw.

In the embodiment, the flat screw 40 has a substantially columnar shape. The flat screw 40 is disposed in the screw case 31 such that the rotation axis RX is in parallel to the Z direction. The drive motor 32 is connected to the upper surface of the flat screw 40. The flat screw 40 rotates about the rotation axis RX at the center in the screw case 31 using a torque generated by the drive motor 32. The flat screw 40 has a groove formation surface 41 that is vertical to the rotation axis RX on a side opposite to the surface to which the drive motor 32 is connected. A vortex-shaped groove 45 is formed in the groove formation surface 41. Note that a detailed shape of the flat screw 40 will be described later with reference to FIGS. 2 to 5.

In the embodiment, the barrel 50 is secured below the screw case 31. The barrel 50 has a screw facing surface 51 that faces the groove formation surface 41 of the flat screw 40. A communication hole 55 that communicates with the nozzle 60 is provided in the screw facing surface 51 at the position on the rotation axis RX of the flat screw 40. A heater 58 is incorporated in the barrel 50. The temperature of the heater 58 is controlled by the control unit 500. Note that a detailed shape of the barrel 50 will be described later with reference to FIG. 6.

A nozzle flow path 62 and a nozzle hole 61 are provided in the nozzle 60. The modeling material is supplied from the plasticization device 90 to the nozzle flow path 62 via the communication hole 55. The modeling material supplied to the nozzle flow path 62 is ejected from the nozzle hole 61. The nozzle hole 61 is a portion with a reduced flow path section provided at an end of the nozzle 60 on a side on which the nozzle 60 communicates with ambient air. The diameter of an opening on the side on which the nozzle hole 61 communicates with ambient air will be referred to as a nozzle diameter dn. A flow path sectional area represented as $Sn = \pi \times dn^2 / 4$ using the nozzle diameter dn and a circular constant $\pi$ will be referred to as a sectional area Sn of the nozzle hole 61. The length from an end of the nozzle hole 61 on the side of the plasticization device 90 to the opening on the side on which the nozzle hole 61 communicates with the ambient air will be referred to as a length Ln of the nozzle hole 61. Note that the sectional area Sn of the nozzle hole 61 may also simply be referred to as a nozzle sectional area Sn. The length Ln of the nozzle hole 61 may simply be referred to as a nozzle length Ln. In the embodiment, the diameter of the nozzle flow path 62 is the same as the diameter of the communication hole 55. The diameter of the nozzle flow path 62 may be smaller than that of the communication hole 55. The nozzle diameter do is smaller than the diameter of the nozzle flow path 62.

Figure 2:
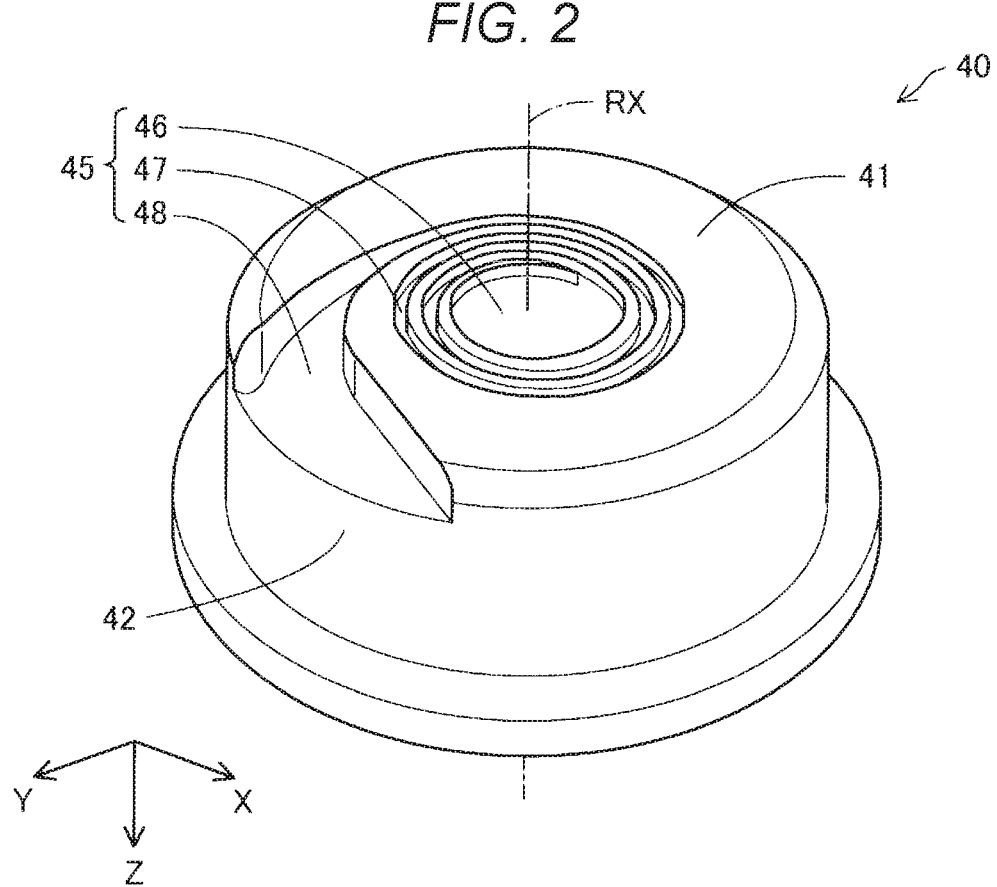
FIG. 2 is a perspective view illustrating a configuration of a flat screw according to the first embodiment.

FIG. 2 is a perspective view illustrating a configuration of the flat screw 40 according to the first embodiment. The flat screw 40 in FIG. 2 is illustrated in a state in which the vertical positional relationship illustrated in FIG. 1 is reversed upside down for easy understanding of the technology.

In the embodiment, one groove 45 is formed in the groove formation surface 41 of the flat screw 40. The groove 45 has a central portion 46, a vortex-shaped portion 47, and a material introducing portion 48. The central portion 46 is a circular concave formed around the rotation axis RX of the flat screw 40. The central portion 46 faces the communication hole 55 provided in the barrel 50.

One end of the vortex-shaped portion 47 is connected to the central portion 46. The vortex-shaped portion 47 extends in a vortex shape so as to draw an arc toward an outer periphery of the groove formation surface 41 around the central portion 46 at the center. The vortex-shaped portion 47 may extend in an involute curve shape or a spiral shape.

The other end of the vortex-shaped portion 47 is connected to the material introducing portion 48. The material introducing portion 48 is a groove-shaped portion that is wider than the vortex-shaped portion 47 provided at an outer peripheral edge of the screw facing surface 51. The material introducing portion 48 continues up to a side surface 42 of the flat screw 40. The material supplied via the supply path 22 is introduced from the material introducing portion 48 to the vortex-shaped portion 47.

Figure 3:
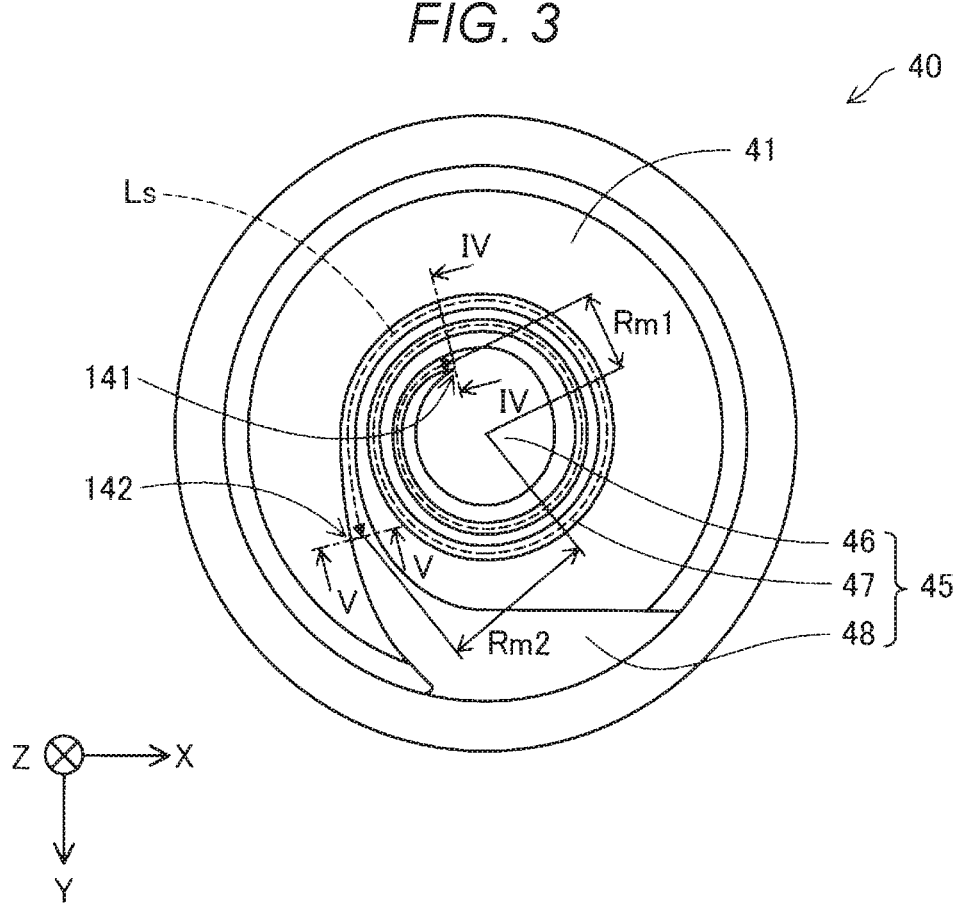
FIG. 3 is a bottom view illustrating a configuration of a groove formation surface according to the first embodiment.

FIG. 3 is a bottom view illustrating the groove formation surface 41 of the flat screw 40. In the embodiment, one end of the vortex-shaped portion 47 is connected to the central portion 46, and the other end of the vortex-shaped portion 47 is connected to the material introducing portion 48. A connection portion between the vortex-shaped portion and the central portion 46 will be referred to as an outlet-side connection portion 141, and a connection portion between the vortex-shaped portion 47 and the material introducing portion 48 will be referred to as an inlet-side connection portion 142. A position at which the width of the vortex-shaped portion 47 is wider than that of the outlet-side connection portion 141 by 10% is assumed to be the inlet-side connection portion 142. The length Ls of the vortex-shaped portion 47 is a length along a vortex from the inlet-side connection portion 142 to the outlet-side connection portion 141. In the embodiment, the width of the vortex-shaped portion 47 increases toward the outer periphery along the vortex. That is, the vortex-shaped portion 47 has the widest width at the inlet-side connection portion 142 and has the narrowest width at the outlet-side connection portion 141. Note that the length Ls of the vortex-shaped portion 47 may also be referred to as a length of the groove 45. An arithmetic mean between a distance Rm1 from the center of the groove formation surface 41 to the outlet-side connection portion 141 and a distance Rm2 from the center of the groove formation surface 41 to the inlet-side connection portion 142 will be referred to as an average radius Rm=(Rm1+Rm2)/2 of the vortex-shaped portion 47.

Figure 4:
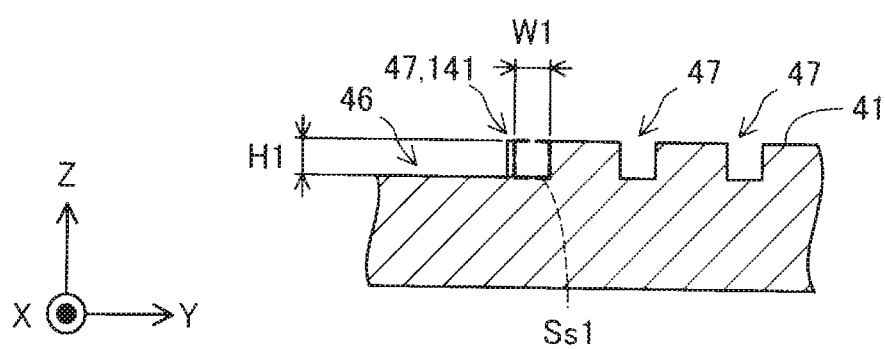
FIG. 4 is a sectional view of the flat screw taken along the line IV-IV according to the first embodiment.

FIG. 4 is a sectional view of the flat screw 40 taken along the line IV-IV in FIG. 3. The section taken along the line IV-IV is a section of the vortex-shaped portion 47 at the outlet-side connection portion 141. In the embodiment, the shape of the section of the vortex-shaped portion 47 that is vertical to a tangent direction of the vortex is a square shape. Therefore, a sectional area Ss1 of the vortex-shaped portion 47 at the outlet-side connection portion 141 can be calculated by a product of a width W1 and a depth H1 of the vortex-shaped portion 47 at the outlet-side connection portion 141.

Figure 5:
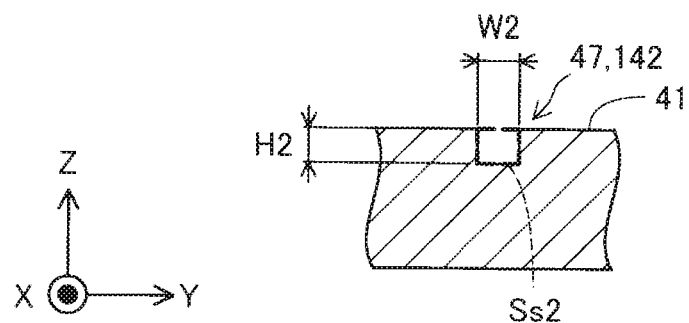
FIG. 5 is a sectional view of the flat screw taken along the line V-V according to the first embodiment.

FIG. 5 is a sectional view of the flat screw 40 taken along the line V-V in FIG. 3. This illustrates the section of the vortex-shaped portion 47 at the inlet-side connection portion 142. In the embodiment, the shape of the section of the vortex-shaped portion 47 that is vertical to the tangent direction of the vortex is a square shape. Therefore, a sectional area Ss2 of the vortex-shaped portion at the inlet-side connection portion 142 can be calculated by a product of a width W2 and a depth H2 of the vortex-shaped portion 47 at the inlet-side connection portion 142. The width W2 of the vortex-shaped portion at the inlet-side connection portion 142 is 1.1 times as wide as the width W1 of the vortex-shaped portion 47 at the outlet-side connection portion 141, and the depth H2 of the vortex-shaped portion 47 at the inlet-side connection portion 142 is the same as the depth H1 of the vortex-shaped portion 47 at the outlet-side connection portion 141. Therefore, the sectional area Ss2 is 1.1 times as large as the sectional area Ss1.

Figure 6:
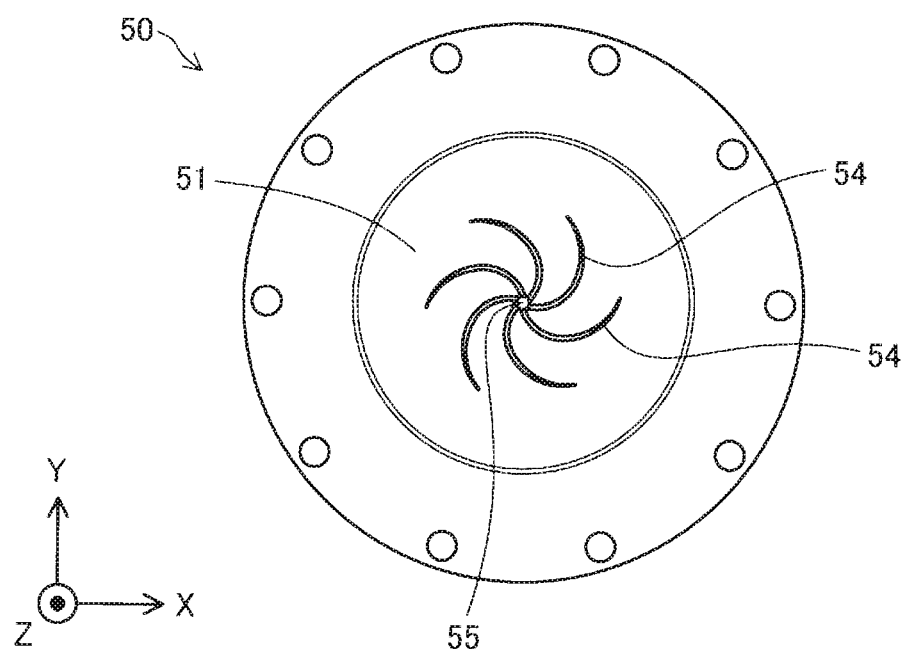
FIG. 6 is a top view illustrating a configuration of a screw facing surface of a barrel according to the first embodiment.

FIG. 6 is a top view illustrating a configuration of the screw facing surface 51 of the barrel 50 according to the first embodiment. As described above, the communication hole 55 that communicates with the nozzle hole 61 is formed at the center of the screw facing surface 51. A plurality of guide grooves 54 are formed around the communication hole 55 in the screw facing surface 51. Each of the guide grooves 54 has one end connected to the communication hole 55 and extends in a vortex shape from the communication hole 55 toward the outer periphery of the screw facing surface 51. Each of the guide grooves 54 has a function of guiding the modeling material to the communication hole 55.

According to the aforementioned configuration of the three-dimensional modeling apparatus 100, the material in the material supply unit 20 is supplied from the side surface 42 of the rotating flat screw 40 to the material introducing portion 48 through the supply path 22 if the control unit 500 executes the modeling processing of modeling a three-dimensional modeled article. The material supplied to the inside of the material introducing portion 48 is transported to the inside of the vortex-shaped portion by rotation of the flat screw 40. The material transported to the inside of the vortex-shaped portion 47 is at least partially melted and is turned into a modeling material in the form of a paste with fluidity through rotation of the flat screw 40 and heating performed by the heater 58 incorporated in the barrel 50. The modeling material is transported toward the central portion 46 in the vortex-shaped portion 47 and flows into the communication hole 55 from the central portion 46 through rotation of the flat screw 40. The modeling material supplied to the nozzle 60 via the communication hole 55 is ejected from the nozzle hole 61 toward the modeling table 310. Note that the volumetric flow rate of the modeling material ejected from the nozzle hole 61 will be referred to as an amount of ejection Qout.

Figure 7:
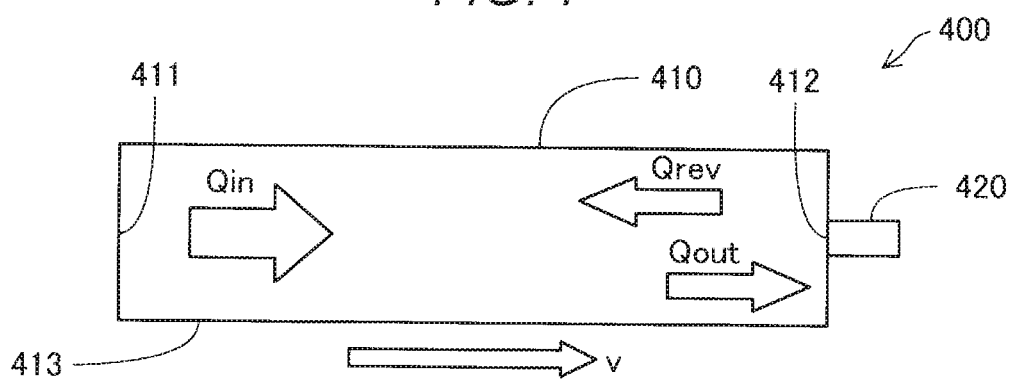
FIG. 7 is an explanatory diagram of a rectangular tube model with a simplified groove in the flat screw.

FIG. 7 is an explanatory diagram of a model 400 in which the groove 45 of the flat screw 40 is simplified. In this model 400, a space surrounded by the groove 45 of the flat screw 40 and the screw facing surface 51 of the barrel 50 is represented as a linear rectangular tube 410 with a constant section. The rectangular tube 410 has the same length as the length Ls of the vortex-shaped portion 47. The rectangular tube 410 has the same sectional area as the average sectional area Ss=(Ss1+Ss2)/2 that is an arithmetic mean between the sectional area Ss1 of the vortex-shaped portion 47 at the outlet-side connection portion 141 and the sectional area Ss2 of the vortex-shaped portion 47 at the inlet-side connection portion 142. The modeling material flows inside the rectangular tube 410. Note that since the material introducing portion 48 and the central portion 46 are wider than the vortex-shaped portion 47 in this model 400, it is assumed to be ignorable. Also, the average sectional area Ss of the vortex-shaped portion 47 may also be referred to as an average sectional area of the groove 45.

The rectangular tube 410 has an inlet portion 411 into which the modeling material flows and an outlet portion 412 from which the modeling material flows. In the actual ejection unit 200, the diameter of the communication hole is sufficiently larger than the nozzle diameter dn. Therefore, a nozzle portion 420 from which the modeling material is ejected is connected directly to the outlet portion 412 of the rectangular tube 410 on the assumption that a flow path resistance of the communication hole 55 is ignorable in the model 400. Note that the nozzle portion 420 has the same sectional area as that of the sectional area Sn of the nozzle. The nozzle portion 420 has the same length as the length Ln of the nozzle. Therefore, a flow path resistance in the nozzle portion 420 is greater than a flow path resistance in the rectangular tube 410.

In this model 400, relative movement between the flat screw 40 and the barrel 50 in the actual ejection unit 200 is represented by a barrel portion 413 that corresponds to a bottom surface of the rectangular pipe 410 moving from the inlet portion 411 toward the outlet portion 412 of the rectangular tube 410 at a constant velocity v. The velocity v is set using an angular velocity of the rotating flat screw 40 and an average radius Rm of the vortex-shaped portion 47.

Figure 8:
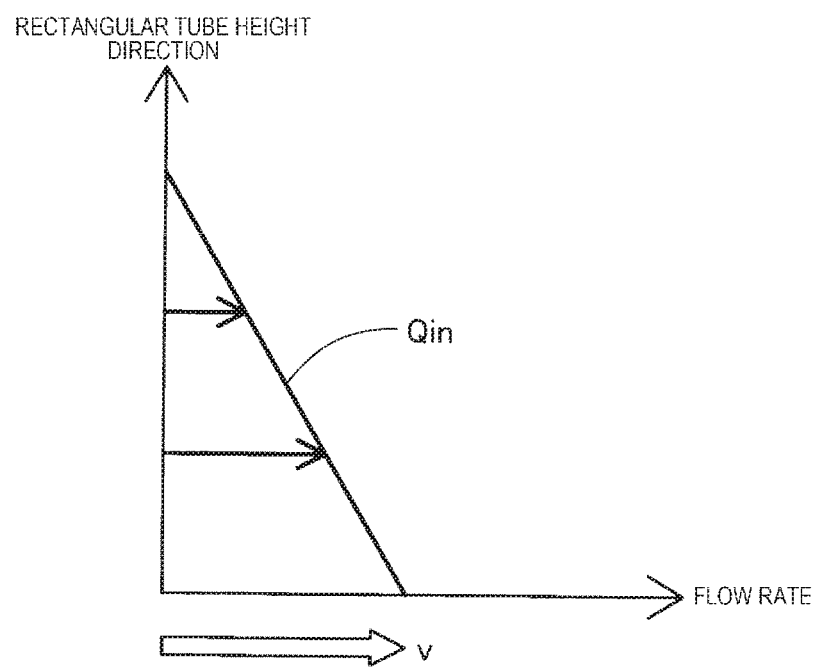
FIG. 8 is a first explanatory diagram illustrating a flow of a modeling material in the rectangular tube.
Figure 9:
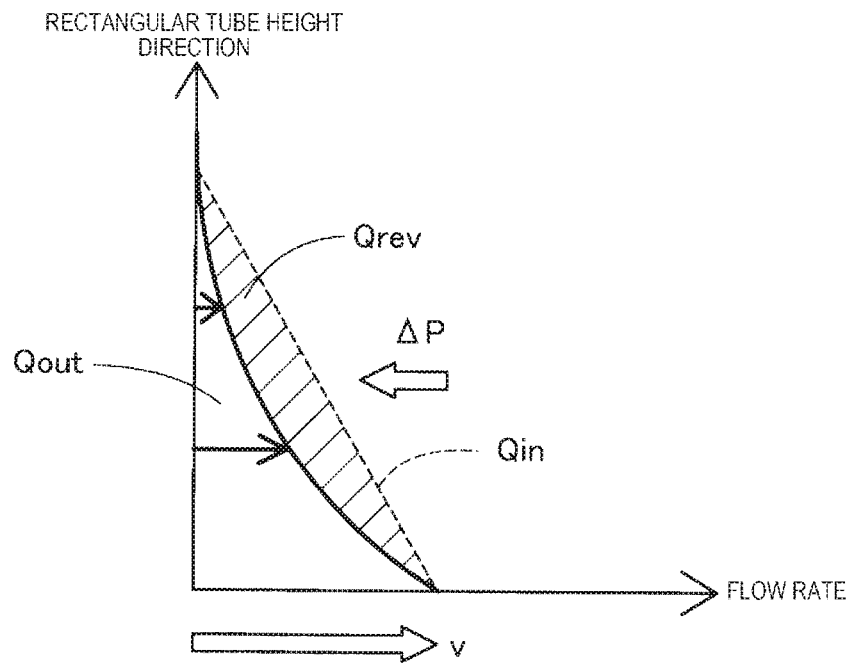
FIG. 9 is a second explanatory diagram illustrating a flow of the modeling material in the rectangular tube.
Figure 10:
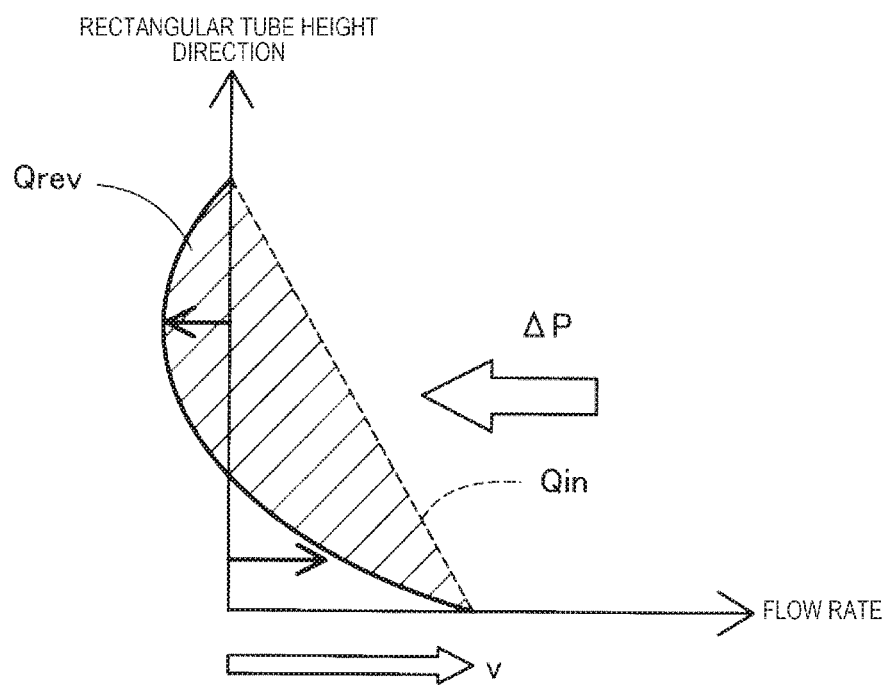
FIG. 10 is a third explanatory diagram illustrating a flow of the modeling material in the rectangular tube.

FIGS. 8 to 10 are explanatory diagrams illustrating a flow of the modeling material in the rectangular tube 410 in the aforementioned model 400. FIGS. 8 to 10 illustrate distribution of the flow rate of the modeling material in the rectangular tube 410 when seen in the width direction of the rectangular tube 410. In this model 400, the flow of the modeling material is uniform in the width direction of the rectangular tube 410.

FIG. 8 is a first explanatory diagram illustrating a flow of the modeling material in the rectangular tube 410. A shear flow occurs in the modeling material in the rectangular tube 410 by the barrel portion 413 moving at the velocity v. The modeling material is transported in the rectangular tube 410 from the inlet portion 411 toward the outlet portion 412 due to the shear flow. The flow rate of the modeling material transported from the inlet portion 411 toward the outlet portion 412 in the rectangular tube 410 will be referred to as an amount of transport Qin.

FIG. 9 is a second explanatory diagram illustrating a flow of the modeling material in the rectangular tube 410. Since the flow path resistance of the nozzle portion 420 is greater than the flow path resistance in the rectangular tube 410, a back pressure that is a pressure of the modeling material at the outlet portion 412 in the rectangular tube 410 rises as the modeling material is transported in the rectangular tube 410. A part of the modeling material transported is refluxed in the rectangular tube 410 from the side of the outlet portion 412 toward the side of the inlet portion 411 due to a differential pressure ΔP generated between the inlet portion 411 and the outlet portion 412 due to a rise in back pressure. The flow rate of the modeling material refluxed in the rectangular pipe 410 will be referred to as an amount of reflux Qrev.

FIG. 10 is a third explanatory diagram illustrating a flow of the modeling material in the rectangular tube 410. If the back pressure further rises, the amount of reflux Qrev in the rectangular tube 410 increases since the differential pressure ΔP between the inlet portion 411 and the outlet portion 412 further increases.

Therefore, it is not possible to obtain a sufficient amount of ejection Qout if the amount of reflux Qrev excessively increases. Therefore, the amount of reflux Qrev and the amount of ejection Qout are preferably equal to each other in order to increase the amount of ejection Qout.

Both the pressure at the inlet portion 411 in the rectangular pipe 410 and the pressure at an end of the nozzle portion 420 on the side opposite to the rectangular pipe 410 are an ambient pressure. Therefore, a relationship between a pressure loss at the rectangular tube 410 and a pressure loss at the nozzle portion 420 are represented as Formula (1) below:

$$\{128 \times \mu(\gamma rev) \times Ls/\pi \times ds^4\} \times Qrev = \{128 \times \mu(\gamma in) \times Ln/\pi \times dn^4\} \times Qout \quad (1)$$

In Formula (1) described above, μ(γrev) represents a shear velocity dependent velocity for the modeling material refluxed in the rectangular tube 410. Ls represents a length of the rectangular tube 410. ds represents a diameter of a circular tube with a sectional area that is equivalent to the sectional area Ss of the rectangular tube 410. μ(γin) represents a shear velocity depending viscosity of the modeling material ejected from the nozzle portion 420. Ln represents a length of the nozzle portion 420. dn represents a diameter of a circular tube with a sectional area that is equivalent to the sectional area Sn of the nozzle portion 420. Note that in the following description, the amount of transport Qin, the amount of reflux Qrev, and the amount of ejection Qout will simply be referred to as Q by omitting the subscripts when description is given without particularly distinguishing these amounts. The average shear velocity γin of the modeling material transported in the rectangular tube 410 and the average shear velocity γrev of the modeling material refluxed in the rectangular tube 410 will simply be referred to as γ by omitting the subscripts when description is given without particularly distinguishing these velocities. The sectional area Ss of the rectangular tube 410 and the sectional area Sn of the nozzle portion 420 will simply be referred to as S by omitting the subscripts when description is given without particularly distinguishing these sectional areas.

The shear velocity dependent viscosity μ(γ) is represented as Formula (2) below using a viscosity μ0 of the modeling material on the assumption of a Newtonian fluid that does not depend on the shear velocity, a shear stress τ acting on the modeling material, and the average shear velocity y of the modeling material.

$$\mu(\gamma) = \mu 0/(1+(\tau \times \gamma)^\alpha \quad (2)$$

The sectional area Ss of the rectangular tube 410 is represented as Formula (3) below using the diameter ds of the circular tube with a sectional area that is equivalent to the sectional area Ss of the rectangular tube 410.

$$\pi \times ds^2/4 = Ss \quad (3)$$

The sectional area Sn of the nozzle portion 420 is represented as Formula (4) below using the diameter do of the circular tube with a sectional area that is equivalent to the sectional area Sn of the nozzle portion 420.

$$\pi \times dn^2/4 = Sn \quad (4)$$

The fact that the amount of reflux Qrev in the rectangular pipe 410 is the same as the amount of ejection Qout from the nozzle portion 420 is represented as Formula (5) below.

$$Qrev = Qout \quad (5)$$

From Formula (1) described above, the relationship of Formula (6) below is required to be established in order for the amount of reflux Qrev in the rectangular pipe 410 and the amount of ejection Qout from the nozzle portion 420 to be the same.

$$\{\mu(\gamma rev) \times Ls/Ss\} = \{\mu(\gamma in) \times Ln/Sn\} \quad (6)$$

Since the flat screw 40 is used in a high-shear region, the shear velocity dependent velocity μ(γ) can be approximated as Formula (7) below using a viscosity μ0 of the modeling material on the assumption of a Newtonian fluid that does not depend on the shear velocity, the shear stress τ, and the shear velocity γ. Note that the value of α is about 0.6 to about 0.8 in a case of molten resin, the shear velocity dependent viscosity μ(γ) can be approximated to ⅔.

$$\mu(\gamma) = \mu 0/(\tau \times \gamma)^\alpha \quad (7)$$

Also, the average shear velocity y is represented as Formula (8) below using the flow rate Q and the sectional area S $$\gamma = Q/S^{3/2} \quad (8)$$

If Formula (6) described above is arranged using Formulae (5), (7), and (8) described above, the relationship represented as Formula (9) below is extracted.

$$Ss/Ls = Sn/Ln \qquad (9)$$

Therefore, it is considered that the amount of ejection Qout increases when the value (Ss/Ls)/(Sn/Ln) becomes about 1.00. That is, it is considered that the amount of ejection of the modeling material from the nozzle hole 61 increases by setting the average sectional area Ss and the length Ls of the vortex-shaped portion 47 and the sectional area Sn and the length Ln of the nozzle hole 61 such that the value of (Ss/Ls)/(Sn/Ln) becomes about 1.00. Note that (Ss/Ls)/(Sn/Ln) will be referred to as an S/L ratio below. The ratio Sn/Ln of the sectional area Sn of the nozzle hole 61 with respect to the length Ln of the nozzle hole 61 will be referred to as a nozzle ratio. The ratio Ss/Ls of the average sectional area Ss of the vortex-shaped portion 47 with respect to the length Ls of the vortex-shaped portion 47 will be referred to as a groove ratio. That is, the S/L ratio means a ratio of the groove ratio Ss/Ls with respect to the nozzle ratio Sn/Ln.

Figure 11:
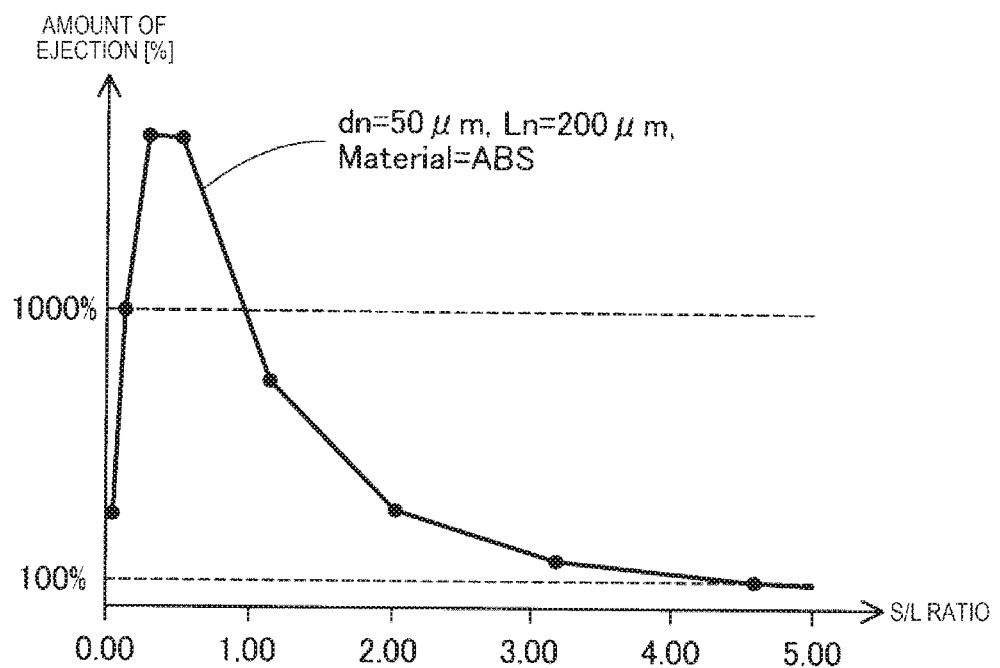
FIG. 11 is a first graph illustrating a relationship between an S/L ratio and an amount of ejection.

FIGS. 11, 13, 15, and 17 are graphs illustrating relationships between the S/L ratio and the amount of ejection. In FIGS. 11, 13, 15, and 17, the horizontal axis represents the S/L ratio, and the vertical axis represents the amount of ejection of the modeling material from the nozzle hole 61. The amount of ejection illustrated in FIGS. 11, 13, 15, and 17 is represented as a proportion with reference to the amount of ejection when the S/L ratio in FIG. 11 is 4.58. Note that it is considered that the S/L ratio is set to about 20.00 in the three-dimensional modeling apparatus in the related art. Hereinafter, results of an experiment performed to confirm that the amount of ejection increases when the value of the S/L ratio is about 1.00 will be described with reference to FIGS. 11, 13, 15, and 17. In this experiment, a relationship between the S/L ratio and the amount of ejection was examined by changing the average sectional area Ss of the vortex-shaped portion 47 within a range of $6.25 \times 10^{-8}$ to $3.60 \times 10^{-3}$ m$^2$.

FIG. 11 is a first graph illustrating the relationship between the S/L ratio and the amount of ejection. In the experiment whose results are illustrated in FIG. 11, a nozzle 60 with a nozzle diameter dn=50 µm and a nozzle length Ln=200 µm was used. ABS resin was used as a material. The temperature of the heater 58 was set such that the temperature of the material became 200.0 degrees Celsius. The rotation frequency of the flat screw 40 was set to 60 rpm. The flat screw 40 with an average radius Rm of the vortex-shaped portion 47=16 mm and the length Ls of the vortex-shaped portion 47=200 mm was used. Note that illustration of a case in which the S/L ratio is equal to or greater than 5.00 is omitted in FIG. 11.

FIG. 12 is a first table illustrating a relationship of the average sectional area Ss, the S/L ratio, and the amount of ejection. FIG. 12 represents a relationship of the average sectional area Ss of the vortex-shaped portion 47, the S/L ratio, and the amount of ejection from the nozzle hole 61 at the position indicated with a circle mark in FIG. 11. Note that although illustration of the case in which the S/L ratio is equal to or greater than 5.00 is omitted in FIG. 11, the case in which the S/L ratio is equal to or greater than 5.00 is also illustrated in FIG. 12. When the S/L ratio is 18.33, the amount of ejection is 11%. When the S/L ratio is 12.73, the amount of ejection is 20%. When the S/L ratio is 8.15, the amount of ejection is 40%. When the S/L ratio is 6.24, the amount of ejection is 50%. When the S/L ratio is 4.58, the amount of ejection is 100%. When the S/L ratio is 3.18, the amount of ejection is 167%. When the S/L ratio is 2.04, the amount of ejection is 333%. When the S/L ratio is 1.15, the amount of ejection is 767%. When the S/L ratio is 0.51, the amount of ejection is 1577%. When the S/L ratio is 0.29, the amount of ejection is 1587%. When the S/L ratio is 0.13, the amount of ejection is 1000%. When the S/L ratio is 0.03, the amount of ejection is 320%.

As a result of the aforementioned experiment, it was found that the upper limit and the lower limit of the S/L ratio were preferably set as follows in order to increase the amount of ejection from the nozzle hole 61. It was found that the upper limit of the S/L ratio was preferably equal to or less than 5.00, was more preferably equal to or less than 2.00, and was further preferably equal to or less than 1.00. It was found that the lower limit of the S/L ratio was preferably equal to or greater than 0.03, was more preferably equal to or greater than 0.10, and was further preferably equal to or greater than 0.20.

Figure 13:
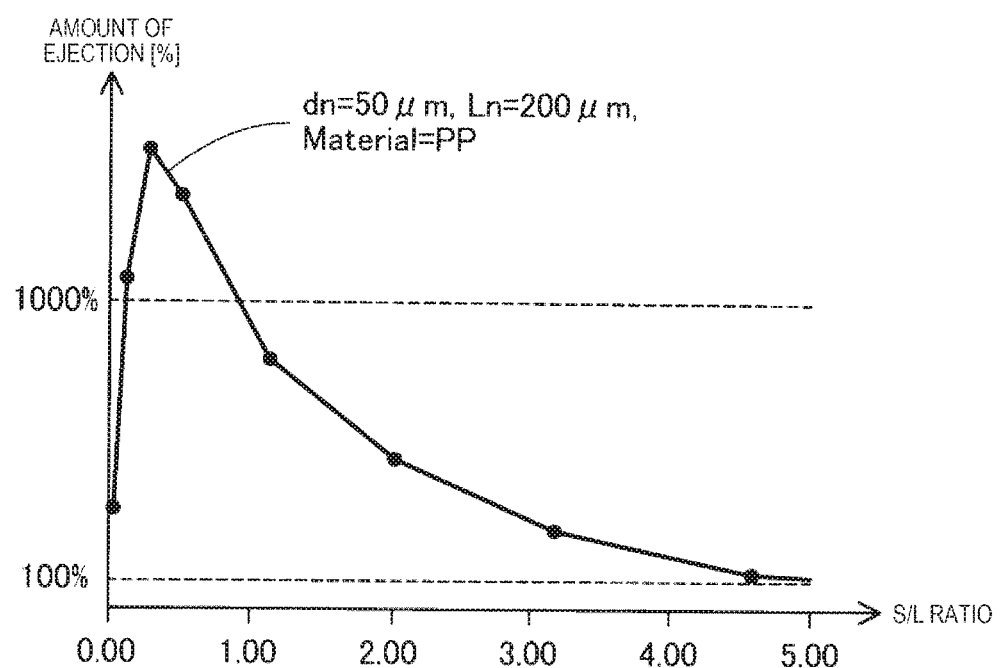
FIG. 13 is a second graph illustrating a relationship between the S/L ratio and the amount of ejection.

FIG. 13 is a second graph illustrating a relationship between an S/L ratio and an amount of ejection. In an experiment whose result is illustrated in FIG. 13, a nozzle 60 with a nozzle diameter dn=50 µm and with a nozzle length Ln=200 µm was used. As a material, polypropylene (PP) was used. The temperature of the heater 58 was set such that the temperature of the material became 200.0 degrees Celsius. The rotation frequency of the flat screw 40 is set to 60 rpm. The flat screw 40 with an average radius Rm of the vortex-shaped portion 47=16 mm and the length Ls of the vortex-shaped portion 47=200 mm was used.

FIG. 14 is a second table illustrating a relationship between an average sectional area Ss, an S/L ratio, and an amount of ejection. FIG. 14 illustrates a relationship between the average sectional area Ss of the vortex-shaped portion 47, the S/L ratio, and the amount of ejection from the nozzle hole 61 at a position indicated with the circle mark in FIG. 13. When the S/L ratio is 18.33, the amount of ejection is 5%. When the S/L ratio is 12.73, the amount of ejection is 12%. When the S/L ratio is 8.15, the amount of ejection is 29%. When the S/L ratio is 6.24, the amount of ejection is 43%. When the S/L ratio is 4.58, the amount of ejection is 123%. When the S/L ratio is 3.18, the amount of ejection is 263%. When the S/L ratio is 2.04, the amount of ejection is 499%. When the S/L ratio is 1.15, the amount of ejection is 833%. When the S/L ratio is 0.51, the amount of ejection is 1377%. When the S/L ratio is 0.29, the amount of ejection is 1533%. When the S/L ratio is 0.13, the amount of ejection is 1100%. When the S/L ratio is 0.03, the amount of ejection is 337%.

As a result of the aforementioned experiment, it was found that the upper limit and the lower limit of the S/L ratio were preferably set as follows in order to increase the amount of ejection from the nozzle hole 61. It was found that the upper limit of the S/L ratio was preferably equal to or less than 5.00, was more preferably equal to or less than 2.00, and was further preferably equal to or less than 1.00. It was found that the lower limit of the S/L ratio was preferably equal to or greater than 0.03, was more preferably equal to or greater than 0.10, and was further preferably equal to or greater than 0.20.

Figure 15:
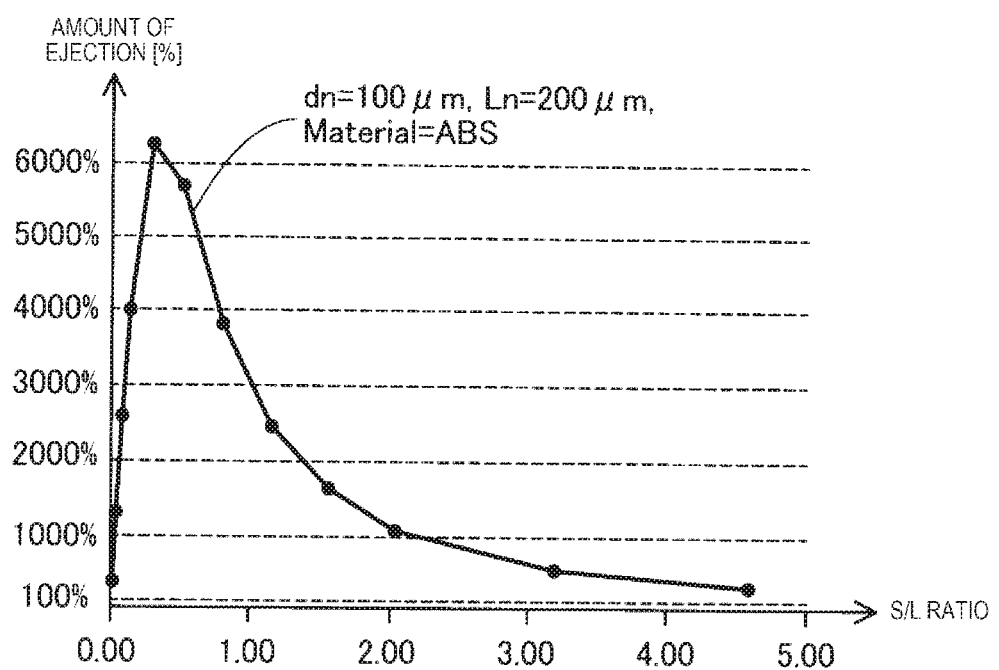
FIG. 15 is a third graph illustrating a relationship between the S/L ratio and the amount of ejection.

FIG. 15 is a third graph illustrating a relationship of an S/L ratio and an amount of ejection. In the experiment whose result is illustrated in FIG. 15, a nozzle 60 with a nozzle diameter dn=100 µm and a nozzle length Ln=200 µm was used. ABS resin was used as a material. The temperature of the heater 58 was set such that the temperature of the material became 200.0 degrees Celsius. The rotation frequency of the flat screw 40 was set to 60 rpm. The flat screw 40 with an average radius Rm of the vortex-shaped portion 47=16 mm and a length Ls of the vortex-shaped portion 47=200 mm was used. Note that illustration of a case in which the S/L ratio is equal to or greater than 5.00 is omitted in FIG. 15.

FIG. 16 is a third table illustrating a relationship of an average sectional area Ss, an S/L ratio, and an amount of ejection. FIG. 16 illustrates a relationship of the average sectional area Ss of the vortex-shaped portion 47, the S/L ratio, and the amount of ejection from the nozzle hole 61 at the position indicated with the circle mark in FIG. 15. Note that although illustration of the case in which the S/L ratio is equal to or greater than 5.00 is omitted in FIG. 15, the case in which the S/L ratio is equal to or greater than 5.00 is also illustrated in FIG. 16. When the S/L ratio is 4.58, the amount of ejection is 267%. When the S/L ratio is 3.18, the amount of ejection is 500%. When the S/L ratio is 2.04, the amount of ejection is 1033%. When the S/L ratio is 1.56, the amount of ejection is 1600%. When the S/L ratio is 1.15, the amount of ejection is 2433%. When the S/L ratio is 0.80, the amount of ejection is 3800%. When the S/L ratio is 0.51, the amount of ejection is 5667%. When the S/L ratio is 0.29, the amount of ejection is 6233%. When the S/L ratio is 0.13, the amount of ejection is 4000%. When the S/L ratio is 0.07, the amount of ejection is 2567%. When the S/L ratio is 0.03, the amount of ejection is 1267%. When the S/L ratio is 0.01, the amount of ejection is 333%.

As a result of the aforementioned experiment, it was found that the upper limit and the lower limit of the S/L ratio were preferably set as follows in order to increase the amount of ejection from the nozzle hole 61. It was found that the upper limit of the S/L ratio was preferably equal to or less than 5.00, was more preferably equal to or less than 2.00, and was further preferably equal to or less than 1.00. It was found that the lower limit of the S/L ratio was equal to or greater than 0.03, was more preferably equal to or greater than 0.10, and was further preferably equal to or greater than 0.20.

Figure 17:
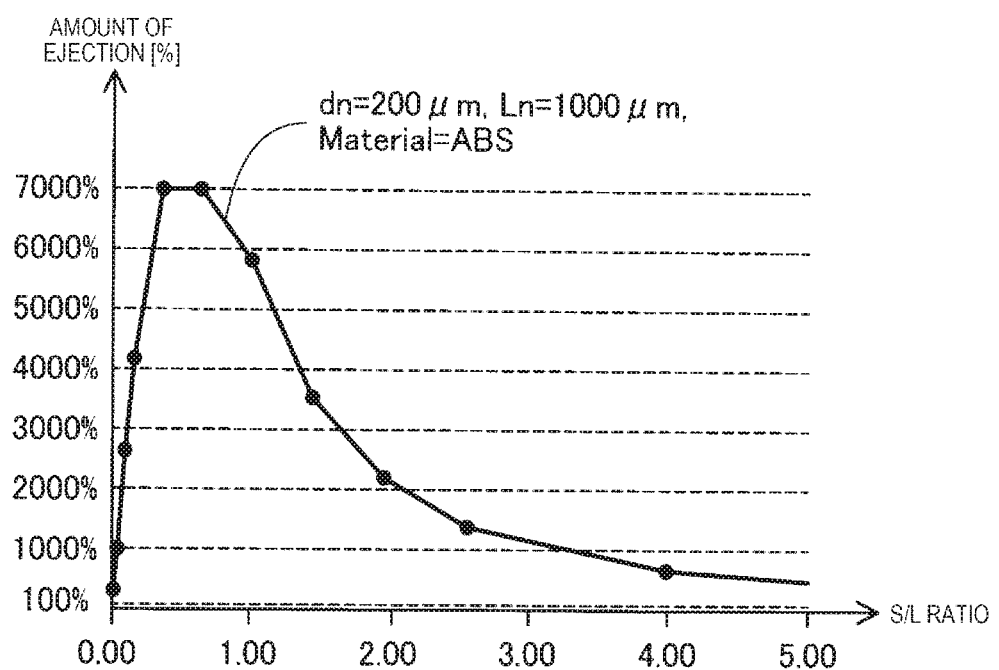
FIG. 17 is a fourth graph illustrating a relationship between the S/LR ratio and the amount of ejection.

FIG. 17 is a fourth graph illustrating a relationship of an S/L ratio and an amount of ejection. In the experiment whose result is illustrated in FIG. 17, a nozzle 60 with a nozzle diameter dn=200 μm and a nozzle length Ln=1000 μm was used. ABS resin was used as a material. The temperature of the heater 58 was set such that the temperature of the material became 200.0 degrees Celsius. The rotation frequency of the flat screw 40 was set to 60 rpm. The flat screw 40 with an average radius Rm of the vortex-shaped portion 47=16 mm and a length Ls of the vortex-shaped portion 47=200 mm was used. Note that illustration of a case in which the S/L ratio is equal to or greater than 5.00 is omitted in FIG. 17.

FIG. 18 is a fourth table illustrating a relationship of an average sectional area Ss, an S/L ratio, and an amount of ejection. FIG. 18 illustrates a relationship of the average sectional area Ss of the vortex-shaped portion 47, the S/L ratio, and the amount of ejection from the nozzle hole 61 at the position indicated by the circle mark in FIG. 17. Although the case in which the S/L ratio is equal to or greater than 5.00 is omitted in FIG. 17, the case in which the S/L ratio is equal to or greater than 5.00 is also illustrated in FIG. 18. When the S/L ratio is 5.73, the amount of ejection is 333%. When the S/L ratio is 3.98, the amount of ejection is 667%. When the S/L ratio is 2.55, the amount of ejection is 1400%. When the S/L ratio is 1.95, the amount of ejection is 2200%. When the S/L ratio is 1.43, the amount of ejection is 3533%. When the S/L ratio is 0.99, the amount of ejection is 5800%. When the S/L ratio is 0.64, the amount of ejection is 7000%. When the S/L ratio is 0.36, the amount of ejection is 7000%. When the S/L ratio is 0.16, the amount of ejection is 4167%. When the S/L ratio is 0.09, the amount of ejection is 2633%. When the S/L ratio is 0.04, the amount of ejection is 1000%.

When the S/L ratio is 0.01, the amount of ejection is 333%.

As a result of the aforementioned experiment, it was found that the upper limit and the lower limit of the S/L ratio were preferably set as follows in order to increase the amount of ejection from the nozzle hole 61. It was found that the upper limit of the S/L ratio was preferably equal to or less than 5.00, is more preferably equal to or less than 2.50, and is further preferably equal to or less than 1.50. It was found that the lower limit of the S/L ratio was preferably equal to or greater than 0.04, was more preferably equal to or greater than 0.10, and was further preferably equal to or greater than 0.15.

Figure 19:
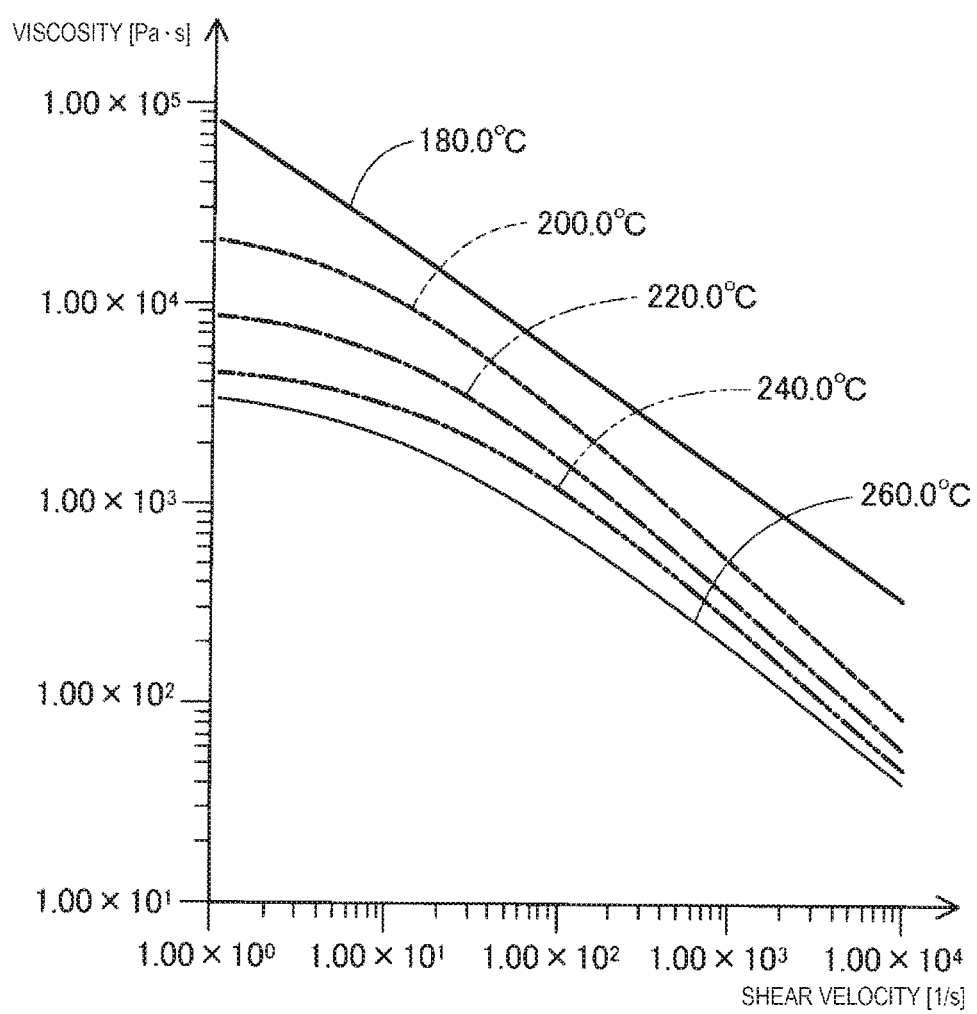
FIG. 19 is a graph illustrating shear velocity dependency of viscosity of ABS resin.

FIG. 19 is a graph illustrating shear velocity dependency of a viscosity of the ABS resin used in the aforementioned experiment. In FIG. 19, the horizontal axis represents a shear velocity, and the vertical axis represents a viscosity. In FIG. 19, relationships between the shear velocity and the viscosity at 180.0 degrees Celsius, 200.0 degrees Celsius, 220.0 degrees Celsius, 240.0 degrees Celsius, and 260.0 degrees Celsius are illustrated using a double-logarithmic graph.

Figure 20:
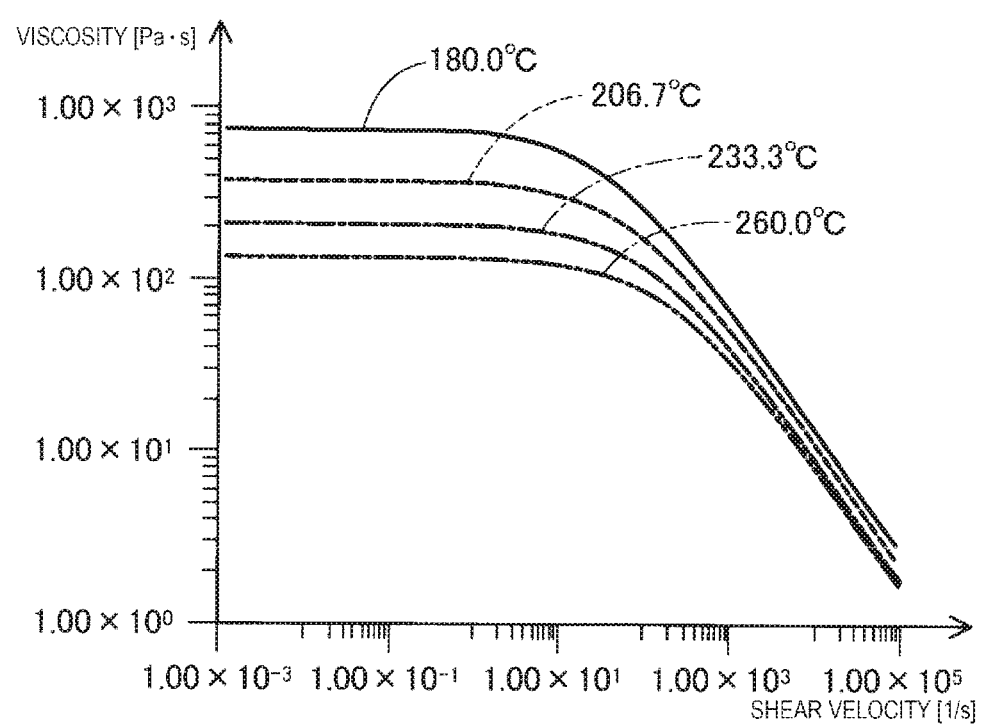
FIG. 20 is a graph illustrating shear velocity dependency of viscosity of polypropylene.

FIG. 20 is a graph illustrating shear velocity dependency of a viscosity of polypropylene used in the aforementioned experiment. In FIG. 20, the horizontal axis represents a shear velocity, and the vertical axis represents a viscosity. In FIG. 20, relationships between the shear velocity and the viscosity at 180.0 degrees Celsius, 206.7 degrees Celsius, 233.3 degrees Celsius, and 260.0 degrees Celsius are illustrated using a double-logarithmic graph.

According to the three-dimensional modeling apparatus 100 in the embodiment as described above, it is possible to increase the amount of ejection of the modeling material from the nozzle hole 61 by setting the average sectional area Ss and the length Ls of the vortex-shaped portion 47 of the flat screw 40 and the sectional area Sn and the length Ln of the nozzle hole 61 such that the S/L ratio falls within a range of equal to or greater than 0.03 and equal to or less than 5.00. In particular, it is possible to further increase the amount of ejection of the modeling material from the nozzle hole 61 when the S/L ratio falls within a range of equal to or greater than 0.03 and equal to or less than 2.00 in the embodiment.

In the embodiment, it is possible to significantly increase the amount of ejection of the modeling material from the nozzle hole 61 by setting the average sectional area Ss and the length Ls of the vortex-shaped portion 47 of the flat screw 40 and the sectional area Sn and the length Ln of the nozzle hole 61 such that the S/L ratio falls within a range of equal to or greater than 0.10 and equal to or less than 1.00.

In the embodiment, it is still possible to prevent the amount of ejection of the modeling material from the nozzle hole 61 from being reduced by appropriately setting the S/L ratio even in a case of a small-diameter nozzle 60 with a nozzle diameter do of equal to or less than 200 μm.

Since the vortex-shaped portion 47 becomes narrower from the material introducing portion 48 toward the central portion 46, it is possible to effectively melt and transport the material in the vortex-shaped portion 47 in the embodiment.

B. Second Embodiment

Figure 21:
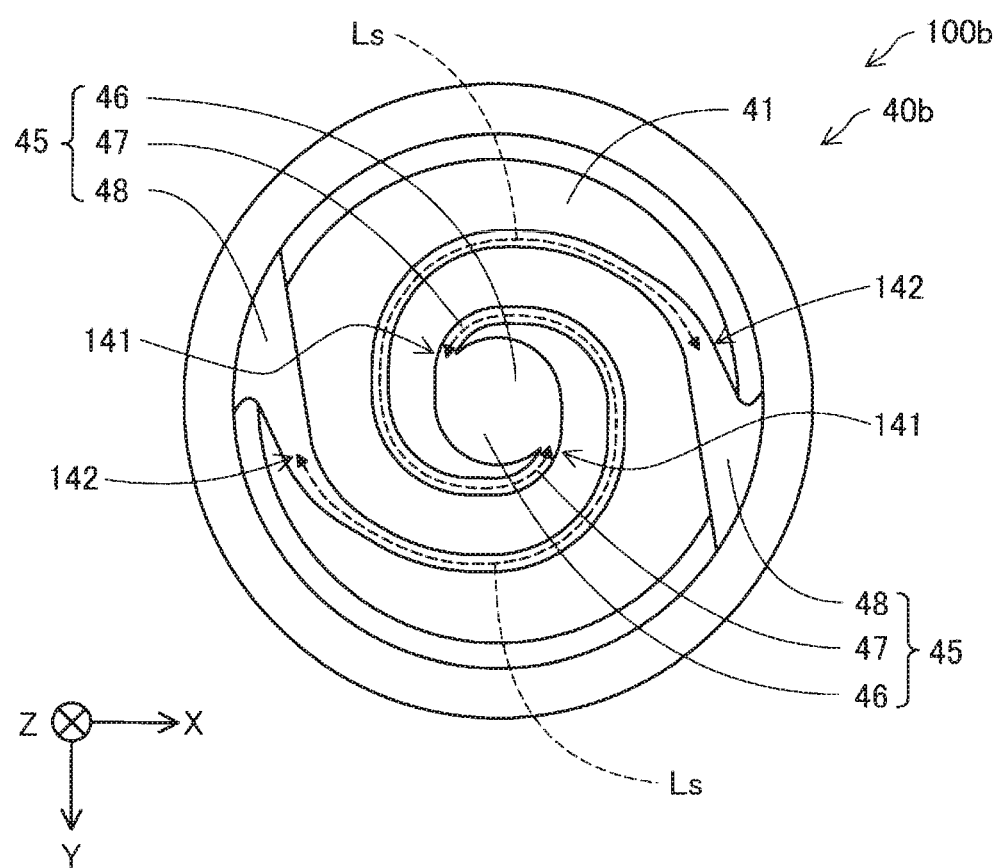
FIG. 21 is a bottom view illustrating a configuration of a groove formation surface according to a second embodiment.

FIG. 21 is a bottom view illustrating a groove formation surface 41 of a flat screw 40b in a three-dimensional modeling apparatus 100b according to a second embodiment. The three-dimensional modeling apparatus 100b according to the second embodiment is different from the first embodiment in that two grooves 45 are formed in the groove formation surface 41 of the flat screw 40b. The other configurations are the same as those in the first embodiment illustrated in FIG. 1 unless otherwise particularly indicated.

In the embodiment, the sectional area Ss1 of the outlet-side connection portion 141 of the vortex-shaped portion 47 is the same as the sectional area Ss2 of the inlet-side connection portion 142 at each of the grooves 45. The length Ls of the vortex-shaped portion 47 is the same at each of the grooves 45.

The fact that the amount of reflux Qrev in the rectangular tube 410 is the same as the amount of ejection Qout from the nozzle portion 420 when a plurality of grooves 45 are provided is represented as Formula (10) below using the number n of the grooves 45. Note that n is a natural number.

$$n \times Qrev = Qout \quad (10)$$

Therefore, a relationship represented as Formula (11) below is extracted using Formulae (1) to (4) and Formulae (6) to (8) described above.

$$n^{1/2} \times Ss/Ls = Sn/Ln \quad (11)$$

Therefore, it is considered that the amount of ejection increases when $n^{1/2} \times (Ss/Ls)/(Sn/Ln)$ is a value around 1.00 when a plurality of grooves 45 are provided. That is, it is considered that the amount of ejection increases when the S/L ratio is a value around 0.71 in the configuration in which two grooves 45 are provided, and that the amount of ejection increases when the S/L ratio is a value about 0.58 in the configuration in which three grooves 45 are provided. Note that $n^{1/2} \times (Ss/Ls)/(Sn/Ln)$ will be referred to as an amended S/L ratio below.

Figure 22:
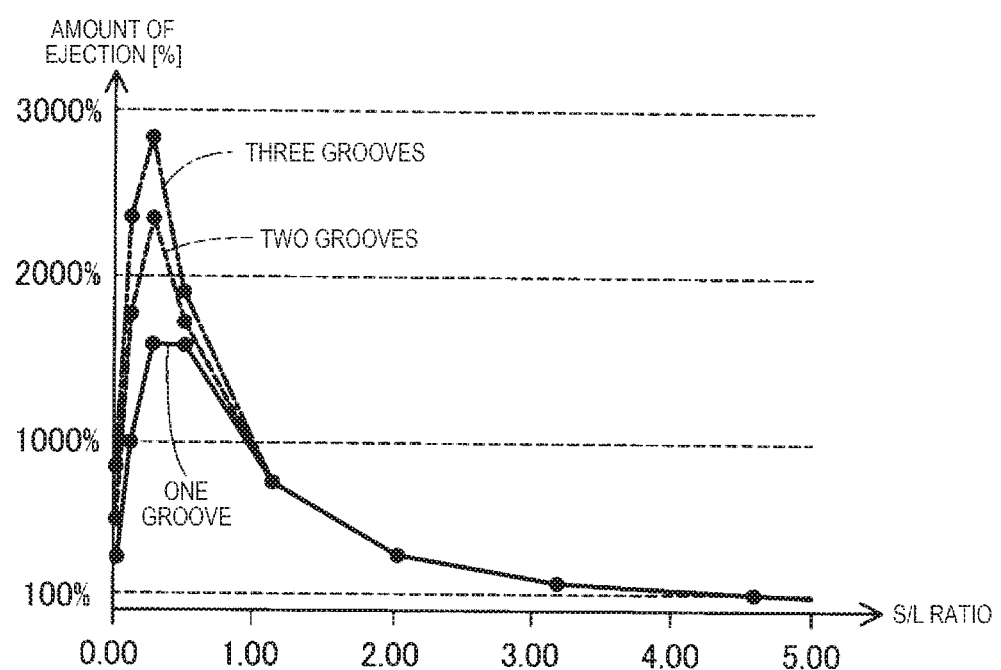
FIG. 22 is a graph illustrating a relationship between an S/L ratio and an amount of ejection when a plurality of grooves are provided.

FIG. 22 is a graph illustrating a relationship between an S/L ratio and an amount of ejection when a plurality of grooves 45 are provided. In FIG. 22, the horizontal axis represents an S/L ratio, and the vertical axis represents the amount of ejection of the modeling material from the nozzle hole 61. The amount of ejection illustrated in FIG. 22 is represented as a proportion with reference to the amount of ejection when the S/L ratio is 4.58 when one groove 45 is provided. FIG. 22 illustrates a result of an experiment conducted in order to confirm that the amount of ejection increases when the S/L ratio is a value around 0.71 in the configuration in which two grooves 45 are provided and the amount of ejection increases when the S/L ratio is a value around 0.58 in the configuration in which three grooves 45 are provided.

In the experiment whose result is illustrated in FIG. 22, a nozzle 60 with a nozzle diameter dn=50 μm and a nozzle length Ln=200 μm was used in each of a case in which one groove 45 was provided, a case in which two grooves 45 were provided, and a case in which three grooves 45 were provided. ABS resin was used as a material. The temperature of the heater 58 was set such that the temperature of the material became 200.0 degrees Celsius. The rotation frequency of the flat screw 40 was set to 60 rpm. A flat screw 40b with an average radius Rm of the vortex-shaped portion 47=16 mm and a length Ls of the vortex-shaped portion 47=200 mm was used. Note that illustration of a case in which the S/L ratio is equal to or greater than 5.00 is omitted in FIG. 22. Results of the case in which one groove 45 was provided are the same as the results described above with reference to FIGS. 11 and 12.

FIG. 23 is a table illustrating a relationship of an average sectional area Ss, an S/L ratio, and an ejection amount when two grooves 45 are provided. FIG. 23 illustrates a relationship of the average sectional area Ss of the vortex-shaped portion 47, the S/L ratio, and the amount of ejection from the nozzle hole 61 at the position indicated by the circle mark in FIG. 22. When the S/L ratio is 18.33, the amount of ejection is 9%. When the S/L ratio is 12.73, the amount of ejection is 18%. When the S/L ratio is 8.15, the amount of ejection is 39%. When the S/L ratio is 6.24, the amount of ejection is 65%. When the S/L ratio is 4.58, the amount of ejection is 102%. When the S/L ratio is 3.18, the amount of ejection is 186%. When the S/L ratio is 2.04, the amount of ejection is 357%. When the S/L ratio is 1.15, the amount of ejection is 770%. When the S/L ratio is 0.51, the amount of ejection is 1720%. When the S/L ratio is 0.29, the amount of ejection is 2340%. When the S/L ratio is 0.13, the amount of ejection is 1780%. When the S/L ratio is 0.03, the amount of ejection is 550%.

FIG. 24 is a table illustrating a relationship of an average sectional area Ss, an S/L ratio, and an amount of ejection when three grooves 45 are provided. FIG. 24 illustrates a relationship of the average sectional area Ss of the vortex-shaped portion 47, the S/L ratio, and the amount of ejection from the nozzle hole 61 at the position indicated by the circle mark in FIG. 22. When the S/L ratio is 18.33, the amount of ejection is 9%. When the S/L ratio is 12.73, the amount of ejection is 18%. When the S/L ratio is 8.15, the amount of ejection is 39%. When the S/L ratio is 6.24, the amount of ejection is 64%. When the S/L ratio is 4.58, the amount of ejection is 102%. When the S/L ratio is 3.18, the amount of ejection is 187%. When the S/L ratio is 2.04, the amount of ejection is 357%. When the S/L ratio is 1.15, the amount of ejection is 790%. When the S/L ratio is 0.51, the amount of ejection is 1893%. When the S/L ratio is 0.29, the amount of ejection is 2813%. When the S/L ratio is 0.13, the amount of ejection is 2340%. When the S/L ratio is 0.03, the amount of ejection is 853%.

As a result of the aforementioned experiment, a peak position of the amount of ejection appears on a side on which the S/L ratio is smaller when two grooves 45 are provided than when one groove 45 is provided. Further, a peak position of the amount of ejection appears on a side on which the S/L ratio is smaller when three grooves 45 are provided than when two grooves 45 are provided.

According to the three-dimensional modeling apparatus 100b in the embodiment as described above, it is possible to increase the amount of ejection of the modeling material from the nozzle hole 61 by setting the average sectional Ss and the length Ls of the vortex-shaped portion 47 of the flat screw 40 and the sectional area Sn and the length Ln of the nozzle hole 61 such that the amended S/L ratio falls within a range of equal to or greater than 0.03 and equal to or less than 5.00 even when a plurality of grooves 45 are provided. In particular, it is possible to further increase the amount of ejection of the modeling material from the nozzle hole 61 when the amended S/L ratio falls within a range of equal to or greater than 0.03 and equal to or less than 2.00 in the embodiment.

According to the embodiment, it is possible to significantly increase the amount of ejection of the modeling material from the nozzle hole 61 by setting the average sectional area Ss and the length Ls of the vortex-shaped portion 47 of the flat screw 40 and the sectional area Sn and the length Ln of the nozzle hole 61 such that the amended S/L ratio falls within a range of equal to or greater than 0.10 and equal to or less than 1.00 even when a plurality of grooves 45 are provided.

C. Other embodiments (C1) In the three-dimensional modeling apparatuses 100 and 100b in the aforementioned respective embodiments, a plurality of ejection units 200 may be provided. In this case, the modeling material can be ejected from the ejection units 200.

(C2) In the three-dimensional modeling apparatuses 100 and 100b in the aforementioned respective embodiments, a plurality of communication holes 55 may be provided in the screw facing surface 51 of the barrel 50. In this case, the modeling material can be ejected from a plurality of nozzles 60.

Figure 25:
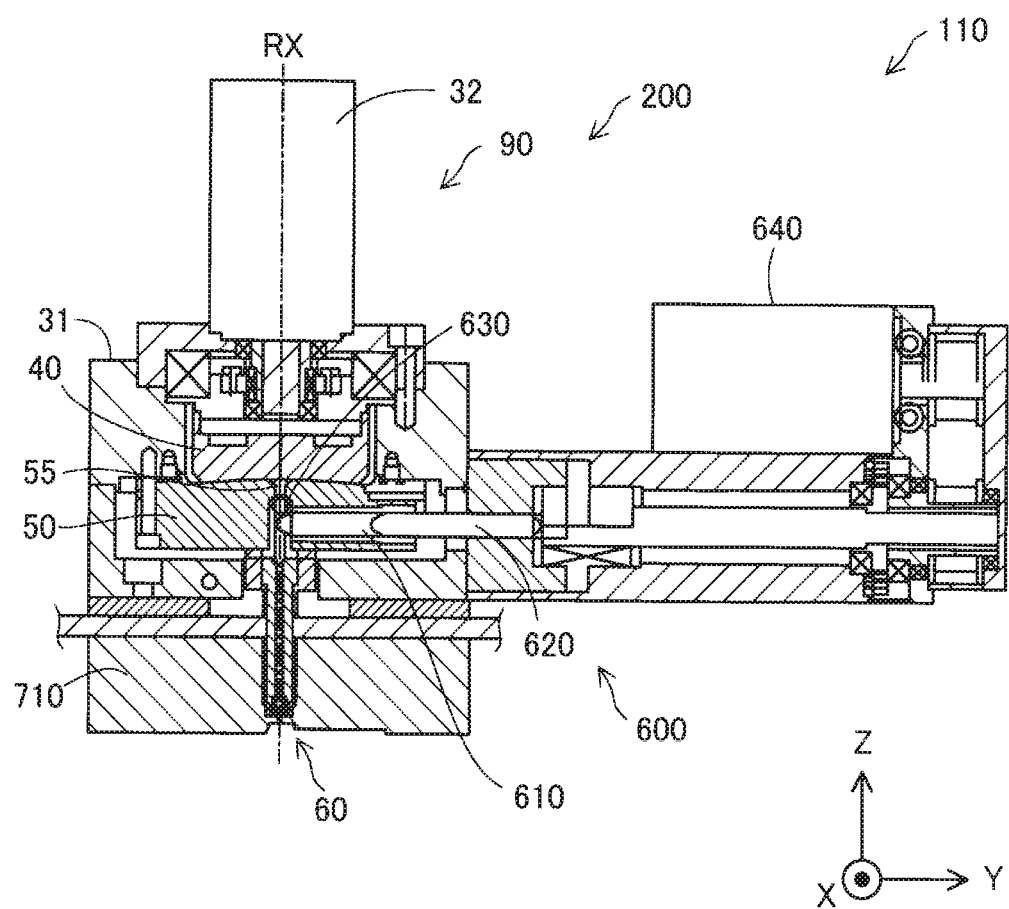
FIG. 25 is an explanatory diagram illustrating an outline configuration of an injection molding apparatus according to another embodiment.

(C3) FIG. 25 is an explanatory diagram illustrating an outline configuration of an injection molding apparatus 110 according to another embodiment. The ejection units 200 and 200b may be used in the injection molding apparatus 110 as well as the three-dimensional modeling apparatuses 100 and 100b. In the injection molding apparatus 110 illustrated in FIG. 25, the ejection unit 200 includes an injection unit 600 in addition to the plasticization device 90 and the nozzle 60. The configuration and the functions of the plasticization device 90 are as described above. Note that illustration of the material supply unit 20 and the supply path 22 is omitted in FIG. 25. The injection unit 600 weights out a molten material supplied from the plasticization device 90 and injects the molten material from the nozzle 60 to a space sectioned by an upper mold 710 and a lower mold, which is not illustrated in the drawing, in a clamped state. The injection unit 600 has an injection cylinder 610, an injection plunger 620, a check valve 630, and an injection motor 640. The molten material in the communication hole 55 is drawn into the injection cylinder 610 and is then weighed out therein by the injection plunger 620 sliding on a side opposite to the side of the communication hole 55 due to drive of the injection motor 640. The molten material in the injection cylinder 610 is pressure-fed to the side of the nozzle 60 and is then injected to the space sectioned by the upper mold 710 and the lower mold by the injection plunger 620 sliding on the side of the communication hole 55 due to drive of the injection motor 640.

D. Other Modes

The present disclosure is not limited to the aforementioned embodiments and can be realized in various modes without departing from the gist thereof. For example, the present disclosure can also be realized in the following modes. The technical features in the aforementioned embodiments corresponding to technical features in the respective modes described below can appropriately be replaced or combined in order to solve a part of or entire problems of the present disclosure or to achieve a part of or entire effects of the present disclosure. Also, some technical features can appropriately be eliminated as long as there is no description that the technical features are essential in the specification.

(1) According to a mode of the present disclosure, there is provided a three-dimensional modeling apparatus. The three-dimensional modeling apparatus includes: a drive motor; a screw that has a groove formation surface with a groove formed therein and that is rotated by the drive motor; a barrel that faces the groove formation surface and has a facing surface with a communication hole formed at the center thereof and a heater; and a nozzle that ejects a modeling material supplied from the communication hole. A relationship of an average sectional area Ss that is an arithmetic mean between a maximum sectional area and a minimum sectional area of the groove, a length Ls of the groove, a sectional area Sn of the nozzle, and a length Ln of the nozzle satisfies Formula (1) below.

$$0.03 \leq (Ss/Ls)/(Sn/Ln) \leq 5.00 \tag{1}$$

According to the three-dimensional modeling apparatus in this mode, it is possible to increase the amount of ejection of the modeling material from the nozzle by setting the dimension of the groove of the screw and the dimension of the nozzle such that the value of (Ss/Ls)/(Sn/Ln) falls within a range of equal to or greater than 0.03 and equal to or less than 5.00.

(2) In the three-dimensional modeling apparatus in the aforementioned mode, the relationship may satisfy Formula (2) below.

$$0.03 \leq (Ss/Ls)/(Sn/Ln) \leq 2.00 \tag{2}$$

According to the three-dimensional modeling apparatus in the aforementioned mode, it is possible to further increase the amount of ejection of the modeling material from the nozzle by setting the dimension of the groove of the screw and the dimension of the nozzle such that the value of (Ss/Ls)/(Sn/Ln) falls within a range of equal to or greater than 0.03 and equal to or less than 2.00.

(3) In the three-dimensional modeling apparatus in the aforementioned mode, the relationship may satisfy Formula (3) below.

$$0.10 \leq (Ss/Ls)/(Sn/Ln) \leq 1.00 \tag{3}$$

According to the three-dimensional modeling apparatus in this mode, it is possible to significantly increase the amount of ejection of the modeling material from the nozzle by setting the dimension of the groove of the screw and the dimension of the nozzle such that the value of (Ss/Ls)/(Sn/Ln) falls within the range of equal to or greater than 0.10 and equal to or less than 1.00.

(4) In the three-dimensional modeling apparatus in the aforementioned mode, a diameter of the nozzle may be equal to or less than 200 μm.

According to the three-dimensional modeling apparatus in the mode, it is possible to prevent the amount of ejection of the modeling material from the nozzle from being reduced by appropriately setting the value of (Ss/Ls)/(Sn/Ln) even if the diameter of the nozzle is equal to or less than 200 μm.

(5) In the three-dimensional modeling apparatus according to the aforementioned mode, a sectional area of the groove decreases toward the communication hole.

According to the three-dimensional modeling apparatus in this mode, it is possible to effectively melt and transport the material in the groove of the screw.

(6) According to a second mode of the present disclosure, there is provided a three-dimensional modeling apparatus. The three-dimensional modeling apparatus includes: a drive motor; a screw that has a groove formation surface with n grooves formed therein and that is rotated by the drive motor; a barrel that has a facing surface facing the groove formation surface and having a communication hole formed at the center thereof and a heater; and a nozzle that ejects a modeling material supplied from the communication hole. The n grooves are connected to each other at end portions at a center side of a vortex, and a relationship among an average sectional area Ss that is an arithmetic mean between a maximum sectional area and a minimum sectional area of each of the n grooves, a length Ls of the grooves, a sectional area Sn of the nozzle, a length Ln of the nozzle, and the number n of the grooves satisfy Formula (4) below.

$$0.03 \leq n^{1/2} \times (Ss/Ls)/(Sn/Ln) \leq 5.00 \quad (4)$$

where n is a natural number

According to the three-dimensional modeling apparatus in this mode, it is possible to increase the amount of ejection of the modeling material from the nozzle by setting the dimension of the groove of the screw and the dimension of the nozzle such that the value of $n^{1/2} \times (Ss/Ls)/(Sn/Ln)$ falls within a range of equal to or greater than 0.03 and equal to or less than 5.00.

(7) According to a third mode of the present disclosure, there is provided an ejection unit. The ejection unit includes: a drive motor; a screw that has a groove formation surface with a groove formed therein and that is rotated by the drive motor; a barrel that has a facing surface facing the groove formation surface and having a communication hole formed at the center thereof and a heater; and a nozzle that ejects a modeling material supplied from the communication hole. A relationship among an average sectional area Ss that is an arithmetic mean between a maximum sectional area and a minimum sectional area of the groove, a length Ls of the groove, a sectional area Sn of the nozzle, and a length Ln of the nozzle satisfies Formula (5) below.

$$0.03 \leq (Ss/Ls)/(Sn/Ln) \leq 5.00 \quad (5)$$

According to the ejection unit in this mode, it is possible to increase the amount of ejection of the modeling material from the nozzle by setting the dimension of the groove of the screw and the dimension of the nozzle such that the value of $(Ss/Ls)/(Sn/Ln)$ falls within a range of equal to or greater than 0.03 and equal to or less than 5.00.

The present disclosure can also be realized in various modes other than the three-dimensional modeling apparatus. For example, the present disclosure can be realized in modes such as an ejection unit and an injection molding apparatus.

What is claimed is:

1. A three-dimensional modeling apparatus comprising:
   a drive motor;
   a screw that has a groove formation surface in which a spiral groove and a spiral wall are formed, the screw being rotated by the drive motor, the spiral groove being formed between adjacent outer sides of the spiral wall;
   a barrel that has a facing surface facing the groove formation surface, the barrel having a communication hole that is formed at a center of the facing surface, the barrel having a heater;
   wherein the spiral groove includes a central portion, a vortex-shaped portion, and a material introducing portion, the central portion faces the communication hole;
   a nozzle that is configured to eject a modeling material supplied via the communication hole;
   a modeling table facing the nozzle and receiving the modeling material from the nozzle, a tip of the nozzle and the modeling table being spaced apart from each other; and
   a moving mechanism disposed below the modeling table, the moving mechanism being configured to move the table toward the nozzle or away from the nozzle, wherein a width of the spiral groove of the screw is smaller than a width of the ridge of the screw, and
   Ss is an average sectional area that is an arithmetic mean between a maximum sectional area and a minimum sectional area of the spiral groove, Ls is a length of the spiral groove, Sn is a sectional area of the nozzle, Ln is a length of the nozzle, and $0.03 < (Ss/Ls)/(Sn/Ln) < 5.00$.

2. The three-dimensional modeling apparatus according to claim 1, wherein $$0.03 \leq (Ss/Ls)/(Sn/Ln) \leq 2.00.$$

3. The three-dimensional modeling apparatus according to claim 1, wherein $$0.10 \leq (Ss/Ls)/(Sn/Ln) \leq 1.00.$$

4. The three-dimensional modeling apparatus according to claim 1, wherein
   a diameter of the nozzle is equal to or less than 200 µm.

5. The three-dimensional modeling apparatus according to claim 1, wherein
   a sectional area of the spiral groove decreases toward the communication hole.

6. A three-dimensional modeling apparatus comprising:
   a drive motor;
   a screw that has a groove formation surface in which n spiral grooves and n spiral walls are formed, the screw being rotated by the drive motor, the n spiral grooves being formed between adjacent outer sides of the n spiral walls, the n being a natural number of two or more;
   a barrel that has a facing surface facing the groove formation surface, the barrel having a communication hole that is formed at a center of the facing surface, the barrel having a heater; wherein the groove includes a central portion, a vortex-shaped portion, and a material introducing portion, the central portion faces the communication hole;
   a nozzle that is configured to eject a modeling material supplied via the communication hole;
   a modeling table facing the nozzle and receiving the modeling material from the nozzle, a tip of the nozzle and the modeling table being spaced apart from each other; and
   a moving mechanism disposed below the modeling table, the moving mechanism being configured to move the table toward the nozzle or away from the nozzle,
   wherein ends of the n spiral grooves are connected to each other at a center area of the groove formation surface,
   a width of each of the n spiral grooves of the screw is smaller than a width of the ridge of the screw, and
   Ss is an average sectional area that is an arithmetic mean between a maximum sectional area and a minimum sectional area of each of the n spiral grooves, Ls is a length of each of the n spiral grooves, Sn is a sectional area of the nozzle, Ln is a length of the nozzle, and $0.03 \leq n^{1/2} \times (Ss/Ls)/(Sn/Ln) < 5.00$.

* * * * *